United States Patent [19]

Chang et al.

[11] 4,168,113
[45] Sep. 18, 1979

[54] GLASS LENS WITH ION-EXCHANGED ANTIREFLECTION COATING AND PROCESS FOR MANUFACTURE THEREOF

[75] Inventors: Leei Chang, Woodstock, Conn.; Jon D. Masso, Whitinsville, Mass.

[73] Assignee: American Optical Corporation, Southbridge, Mass.

[21] Appl. No.: 813,210

[22] Filed: Jul. 5, 1977

[51] Int. Cl.$^2$ .......................... G02B 1/10; G02C 7/02
[52] U.S. Cl. .................... 351/166; 65/30 E; 350/165; 351/177
[58] Field of Search .................. 351/159, 163, 166; 350/164, 165; 65/30 E

[56] References Cited
U.S. PATENT DOCUMENTS

| | | | |
|---|---|---|---|
| 3,185,020 | 5/1965 | Thelen | 350/164 |
| 3,743,491 | 7/1973 | Poole et al. | 351/166 X |
| 3,984,581 | 10/1976 | Doubler et al. | 350/164 X |

*Primary Examiner*—John K. Corbin
*Assistant Examiner*—Scott J. Sugarman
*Attorney, Agent, or Firm*—Jeremiah J. Duggan; Alan H. Spencer; Stephen Schneeberger

[57] ABSTRACT

There is disclosed a glass ophthalmic lens including an ion-exchanged antireflection coating. Metal oxide films including $TiO_2$, $CeO_2$, $ZrO_2$, $La_2O_3$, $Nd_2O_3$, $Al_2O_3$, and $SiO_2$ when evaporated on glass lenses in a vacuum chamber by electron-beam techniques form hard optical coatings which are chemically stabile at high temperatures and allow potassium and sodium ions to traverse the thickness thereof without changing chemical composition or physical integrity thereby enhancing ability of glass lenses to be ion-exchanged in a conventional ion-exchange treatment. This allows antireflection coated glass lenses to pass impact-resistant standards ANZI Z80.1 for prescription ophthalmic lenses and USAS Z87.1 for safety lenses.

6 Claims, No Drawings

GLASS LENS WITH ION-EXCHANGED ANTIREFLECTION COATING AND PROCESS FOR MANUFACTURE THEREOF

BACKGROUND OF THE INVENTION

All glass ophthalmic lenses are required by law to pass certain impact-resistant standards such as ANZI Z80.1 for prescription ophthalmic lenses and USAS Z87.1 for safety lenses. In order to achieve the glass strength required for these standards, the glass lenses must either be heat treated to produce a tensilized surface or ion-exchanged. To ion exchange a glass lens, the lenses are suitably ground, polished, and edged, and then treated in a carefully controlled heated ion-exchange bath to surface-harden the lens. Every exposed surface of such a lens is treated to render it highly impact and shock resistant.

The ion-exchange process is such that the hardened and impact resistance conditions desired are effected in the treated lens comparatively rapidly and in sizeable numbers without in any way introducing significant amounts of distortion in the finished lenses. This is so even though the lenses include all of those normally found in an ordinary ophthalmic lens series. As is well known, such a series may include lenses which vary greatly in shape, size, and thickness, including a wide range of positive and negative dioptric values (from +20.00 diopters to −20.00 diopters) for corrective eye care purposes and even no-power or plano lenses such as used in safety glasses and the like. In fact, the lenses which may be so treated may include both single vision lenses and multifocal lenses; and as to multifocal lenses, may be ones formed of a single piece of glass or of the bifocal or trifocal type, wherein some are primarily formed of an ophthalmic crown glass but additionally have in the usual fashion bifocal or trifocal segments of higher refractive index glass inserted therein. Even lenses for aphakic and cataract patients may be so treated. In the above discussion, we mentioned certain standard tests which lenses must pass. For example, heretofore ophthalmic lenses which were, for example, 3 mm in thickness and which have been hardened to be impact resistant by heating to a controlled temperature and thereafter chilled by jets of air simultaneously directed towards opposite sides have provided surface-hardened lenses of good quality which are capable of withstanding the Z87.1-1968 drop-ball test, i.e. a 1.0" steel ball weighing 2.35 ounces is dropped freely onto the outer surface of a lens from a height of 50" without fracture of the lens. Such a lens is known as a "safety lens." In many manufacturing areas, the use of such safety lenses is mandatory. While some of the air-jet-cooled hardened lenses have no power or are plano and are used as safety lenses, others may contain different individuals' prescriptive corrections, either positive or negative and may vary greatly in dioptric values.

A drop-ball test for use when considering hardened lenses for ordinary, i.e. non-safety, use is one in which the lenses are not subjected to conditions as severe as those expected in use for the safety lenses, and is comprised of a drop-ball test proposed by the Z80 Committee of the American National Standards Institute and hereafter referred to as the Z80 drop-ball test. The test consists of a ⅝" stainless steel ball weighing 0.56 ounces dropped freely onto the outer surface of a lens from a height of 50". (There are other requirements not set forth herein). A standard minimum thickness for conventional lenses may be taken as 2 mm rather than the 3 mm thickness mentioned above for safety lenses.

In the production of such air-jet-hardened or tempered lenses, there are a fair number of plano ones for every 100 lenses produced and treated which will not pass the drop-ball test. Furthermore, when positive and negative prescriptive powers are provided in the lenses to care for different individuals' requirements, the number of lenses for every 100 lenses which will not pass due to internal strains and breakage seems to increase, and even increases at a greater rate for strongly negative lenses as compared to the positive lenses in a given series. In fact, in lenses of strong corrective powers, particularly lenses of negative powers, distortions may be so great as in the otherwise finished lenses as to materially distort the already built-in correction intended for an individual. Additionally, other conventional forms of lenses which have been air-jet hardened, such as bifocal lenses, having built-in reading segments of higher index glass, and bifocal lenses of the one-piece type having steps, or ledge-like portions, extending entirely across the lenses between the near and distance portions thereof may fail more frequently to pass the standard drop-ball test than other types of lenses due possibly to greater strains and stresses developed near such inserts and stepped portions. Alternatively, the requisite strength to resist the impact tests discussed above may be obtained in glass ophthalmic lenses by ion-exchange conditioning, or hardening, of all exposed surfaces thereof. It is necessary that the glass article, however, contain sodium ions. Such glass articles, or lenses, containing the requisite sodium ions are contacted with a molten salt bath containing alkaline metal ions having a diameter greater than that of the sodium ions in the glass. Where potassium ions are substituted for sodium ions, a compressive stress is developed in the surface layer of the glass article as disclosed in the Journal of the American Ceramics Society, Vol. 45, No. 2, (February, 1962), Pages 59–68. In the process described in the above article, ion exchange is conducted at a temperature below the strain point of the glass so as to inhibit rearrangement and viscous flow during ion exchange of the monovalent metal ions migrating into the glass surface. The larger ions from the molten salt in effect are squeezed into sites originally occupied by the smaller alkaline metal ions. The compressive stress set up by this crowding effect substantially increases the impact strength of the glass.

In an article entitled "Strengthening by Ion Exchange" in the Journal of the American Ceramics Society, (May, 1964), Pages 215–219, glasses are described which are uniquely capable of having strength imparted to them by an ion-exchange process conducted below the strain point of glass.

Ion exchange treatment of alkaline metal silicate glasses has been conducted at temperatures above the strain point as well as below the strain point. In one such process, smaller lithium ions replace larger sodium and/or potassium ions in contrast to the process described above when a larger ion (potassium) replaces a smaller ion (sodium) below the strain point. In one method of chemical strengthening as described in U.S. Pat. No. 2,779,136, a silicate glass containing an exchangeable potassium, or sodium, ion is treated at a temperature above its strain point with lithium ions, for example, in a molten lithium salt. The lithium ions migrate into the glass in exchange for potassium or sodium ions which migrate out into the lithium salt. During the exchange process, molecular rearrangement occurs since exchange takes place above the strain point. The smaller lithium ions form a new surface layer on the glass having a lower coefficient of expansion as compared to the original glass. As the article cools, compressional stresses are set up by differential thermal expansion thereby strengthening the glass.

U.S. Pat. No. 4,012,131 of Krohn et al is yet another example of prior art in the field of ion exchange of ophthalmic glass. That patent relates specifically to a composition of soda-silica glass, or soda-lime-silica glass, which is particularly suitable for the fabrication of strengthened ophthalmic glasses by ion exchange treatment. Another prior art patent which discloses a suitable glass is U.S. Pat. No. 3,790,260, which patent provides recognition of the importance of depth of penetration of the compressively stressed surface layer as a means of insuring a satisfactory ophthalmic lens which will resist lens breakage even after abrasion as a result of long use.

For the purposes of this invention, we consider that the standard ion-exchange process requires a bath of alkaline metal salts such as $KNO_3$. The glass lenses are immersed in such a bath at temperatures in the vicinity of the strain point thereof for a period of 8 to 16 hours depending on whether or not the temperature is above or below the strain point. The preferred method, according to this invention, is above the strain point and is as disclosed in U.S. application Ser. No. 774,487, now U.S. Pat. No. 4,106,307. However, the process is equally applicable to ion-exchange treatments below the strain point as, for example, disclosed in the Boyd U.S. Pat. No. 3,790,260, also discussed above.

It is also known that it is desirable to improve the antireflective characteristics of lenses. A common coating material is magnesium fluoride, $MgF_2$. However, glass lenses which are to be subjected to ion-exchange processing cannot be coated with such a material since it will be destroyed by the high temperature treatment necessary for ion exchange. It has, therefore, been most important to apply such coatings at the very end of the process before placing a prescription in the lens. It is also desirable that the material used to coat the lens be strong enough to obtain the desired impact resistance. Yet further, the coatings should be capable of application at the factory level on all lenses before they are edged and ion exchanged. Otherwise, the many complicated, labor-consuming, expensive procedures described above which are invested in fabricating a lens can be lost when an unsuccessful, or unsatisfactory coating is put on at a final stage of manufacture at the dispensing level, or stage, of eyeglass preparation and marketing.

Coating for antireflection characteristics is well known in the art. For example, previous workers (German Pat. No. 1,204,048) in this art have sought to solve the problem of successfully applying durable vitreous transparent layers by applying a protective layer of silicon dioxide by vapor deposition. Most workers, however, with this type of material have used a synthetic polymer substrate. Another example of a synthetic polymer substrate coated to improve antireflective properties is U.S. Pat. No. 3,645,779 wherein there is disclosed vacuum deposition of a glass having carefully-controlled boron oxide content. U.S. Pat. No. 3,811,753 discloses a coated optical component comprised of a synthetic polymer substrate with a silicon monoxide or a silicon dioxide layer disposed thereover to a thickness of 1 to 10 microns. Deposition of the vitreous coating is by conventional evaporation techniques. U.S. Pat. No. 3,248,256 contains a description of a conventional vacuum evaporation process for forming a silicon dioxide film by vaporization of silicon monoxide in an oxygen atmosphere. Reissue U.S. Pat. No. 26,857 described a process for the manufacture of thin films of absorption-free silicon dioxide by the vaporization of silicon dioxide, preferably a mixture of $SiO_2$ and Si, in an atmosphere enriched with oxygen. U.S. Pat. No. 3,700,487 discloses an antifog abrasion-resistant coating of lightly cross linked polyvinyl alcohol on a diallyl glyocarbonate lens in which adequate bonding of the antifog coating is obtained by first hydrolitically treating the polymer surface by dipping it into aqueous or alcoholic solution of caustics such as sodium or potassium hydroxide.

Copending application Ser. No. 510,270, now U.S. Pat. No. 3,991,234 of the same assignee as the present case, described vacuum coating technology particularly suited for the practice of the instant invention. Such vacuum coating is still in its infancy because of the problems of compatability of the thermal expansion of coating and substrate materials. Crazing and delamination of the coating may occur if special attention is not paid to interface bonding to compensate for stresses induced by such differential thermal expansion. Coating durability is further limited because of susceptibility to attack by solvents, i.e., the coating may allow penetration of solvent which can cause failure of the coating substrate interface resulting in flaking and delamination of the coating. Moisture from the atmosphere can, in certain cases, do damage to coated glass objects when there is prolonged exposure to weathering conditions. Thus a coating applied successfully to a lens substrate should be useful both in its optical and physical function, stabile against hostile environment such as thermal shock, extreme temperature storage, humidity aging and chemical attacks, and ideally is capable of being applied at the factory level on all lenses before they are edged, ion exchanged, and otherwise prepared for an ultimate consumer. Thus, the coating must be capable of allowing penetration by sodium and potassium ions in order for the desired ion exchange to proceed when the lenses subsequently are placed in a suitable bath of the selected alkaline metal.

SUMMARY OF THE INVENTION

It has been discovered that metal oxide films including $TiO_2$, $CeO_2$, $ZrO_2$, $La_2O_3$, $Nd_2O_3$, $Al_2O_3$, and $SiO_2$, when evaporated in a vacuum chamber by electrom beam techniques, form hard optical coatings which are chemically stabile at high temperatures. When thin films of these oxides are properly deposited to a quarter or half-wave thickness in the visible range (the geometrical thicknesses are on the order of 0.1 to 0.2 microns, or 40 to 8 micro inches), they allow the potassium and sodium ions to penetrate the thickness of the film without changing the chemical composition thereof or the physical integrity of the bond between the coating and the glass substrate being ion-exchange toughened.

After certain films are deposited on a glass lens substrate, it has been found that the potassium nitrate bath can have the effect of furthering oxidation of the metal oxide films. If such a chemical reaction is allowed to alter film composition, it becomes slightly thicker in optical thickness and less absorbent in the near ultraviolet region. It is therefore desirable to utilize these materials in designing optical interference coatings such as antireflection coatings in an effort to eliminate a last coating operation at the prescription laboratory and place it back at the factory level.

Certain thin film materials, including $Al_2O_3$, do not allow the potassium and sodium ions to be exchanged through one-quarter wave optical thickness and it is therefore further necessary to carefully consider molecular configuration when selecting the materials to be used.

One useful coating combination is a non-quarter wave bilayer antireflection coating. This coating design has been chosen because it allows the reflectance to be decreased to near 0 percent at the center wavelength and the total optical thickness of the coating combination is less than two quarter waves. For a conventional crown glass ($n=1.523$) substrate, for example (the preferred embodiment), the antireflecting coating formulation is: G 0.26H 1.33L A*, wherein G denotes glass substrate, 0.26H denotes 0.26 quarter wave optical thickness of a high index material, and 1.33L denotes 1.33 quarter wave optical thickness of a low index material. The coating materials, according to the preferred embodiment, are $CeO_2$ ($n=2.34$) as the high index material and $SiO_2$ ($n=1.46$) as the low index material. Antireflective coatings made with this composition have demonstrated their optical function and ability to withstand the ion-exchange process without being damaged. Other coating combinations using the above-mentioned oxide filming materials can include various bilayer, trilayer and other multilayer antireflection coating designs which otherwise follow the parameters herein disclosed. Some further coating constructions utilizing the concepts of this invention are described in the following detailed description of the invention.

*A=Air

OBJECTS OF THE INVENTION

It is thus among the objects of this invention to provide a coating which may be successfully applied to glass lens surfaces which combination of lens and coating will be useful in the required optical and physical functions, stabile against hostile environment such as thermal shock, extreme temperature storage, humidity aging, chemical attacks, and capable of ion-exchange toughening at the factory level before the lenses are edged or subjected to the ion-exchange treatment itself.

DETAILED DESCRIPTION OF EMBODIMENTS OF THE INVENTION

Coating compositions which are useful according to the concepts of this invention are set forth in the following tables. Note the introduction to each table includes, in its format, the numerical relationship which must be present between the substrate, high index material, and low index material identified by the letters G, H, and L, respectively identified above.

Ion Exchangeable Antireflection Coatings on Glass Ophthalmic Lenses

Table I

| Bilayer Antireflection Coatings G 1.0H 1.0L air | | |
|---|---|---|
| G | H | L |
| ($n=1.52$) | $SiO_x$, $1<x<2$ ($1.47<n<1.90$) | $SiO_2$ ($n=1.46$) |
|  | $MgO-Al_2O_3-SiO_2$ | Schott #8329 |

Table I-continued

| Bilayer Antireflection Coatings G 1.0H 1.0L air | | |
|---|---|---|
| G | H | L |
|  | Spinel ($n=1.68$) | Glass ($n=1.47$) |

Table II

| Bilayer Antireflection Coatings G 2.0H 1.0L air | | |
|---|---|---|
| G | 2H | L |
| ($n=1.52$) | $Nd_2O_3$ ($n=1.86$) | $SiO_2$ ($n=1.46$) |
|  | $ZrO_2$ ($n=2.05$) | Schott #8329 |
|  | $CeO_2$ ($n=2.34$) | Glass ($n=1.47$) |
|  | $TiO_2$ ($n=2.40$) |  |

Table III

| Bilayer Antireflection Coatings G 1.0M 2.0H 1.0L air | | | |
|---|---|---|---|
| G | M | 2H | L |
| ($n=1.52$) | $SiO_x$ | $ZrO_2$ | $SiO_2$ |
|  | Spinel | $CeO_2$ | Schott Glass |
|  |  | $TiO_2$ |  |

Coating successfully applied according to the concepts of this invention is ion-exchanged at the factory without deleterious chemical or physical effect being discernable to antireflection characteristics of the coatings. Furthermore, the coatings do not deleteriously effect the otherwise superior ion-exchange induced strength characteristics of the glass lens substrate.

It is an important aspect of this invention that certain thin film coating materials, especially those of refractory metal oxides, can be deposited singularly or in combination with other materials in forming the antireflection optical coatings. The coatings allow enhanced transmission of light and thus have reduced reflection properties yet can be subsequently ion-exchanged according to standard processes without damage to the coating nor the functions of the coating or the integrity thereof. Even though coating materials and ion-exchanged lenses have previously existed, to the best of our knowledge, no one has successfully found an ion-exchangeable antireflection coating. As noted above, the preferred lens composition, according to this invention, is a crown ophthalmic glass of an index of 1.523. In the preferred embodiment, the ion-exchange technique utilizes a potassium nitrite bath at a temperature of 940° F. for a period of 8 hours. As will be recognized, this is a process of the type disclosed in application Ser. No. 744,487 mentioned above.

Also, according to the preferred embodiment, the glass lens is cleaned by rubbing the surface with a cleansing agent, preferably fine alumina oxide powder, rinsed in distilled water, and wiped with alcohol. Lenses are then loaded into a vacuum chamber of the type described in U.S. patent application Ser. No. 726,851, now abandoned of Chang and Verburg, assigned to the same assignee of the present case. Coating materials of silica oxide, titanium dioxide, and an evaporable glass (in the preferred embodiment Schott #8329) are loaded into an electron beam evaporation source of the vacuum chamber consisting of separate water-cooled boats. The chamber is then pumped down to a pressure of $2 \times 10^{-6}$ torr. The lenses are heated to a temperature of 300° C. The materials are then sequentially evaporated with one-quarter wave of silicon oxide, one-half wave of titanium dioxide, and one-quarter wave of the evaporable glass being applied. After vacuum deposition, the lenses are allowed to cool down to about 100° C., and the vacuum chamber returned to atmospheric pressure. The coated lenses are then removed from the chamber.

U.S. Military Standardization Handbook 141, Chapter 20, entitled "Application of Thin Film Coatings" was used by the inventors to consider single and multilayer antireflection design parameters. The theoretical concepts of antireflection coating design was reviewed by considering the book "Physics of Thin Films", Vol. 2, entitled "Antireflection Coatings for Optical and Infrared Optical Materials" by G. T. Cox and G. Hass. Material selections for optical thin films was considered by review of "Optical Film Materials and Their Applications" by G. Hass and E. Ritter, Journal of Vacuum Science and Technology 4, No. 2, pages 71-79. U.S. Pat. No. 3,185,020 of A. J. Thelen dealing with trilayer quarter-half-quarter wave antireflection coating designs was also studied. In addition, Itoh U.S. Pat. No. 3,934,961 dealing with trilayer antireflection coating in which a first layer is a mixture of $Al_2O_3$ and $ZrO_2$ was also considered.

As has been above mentioned, treatment of glass lenses to impart the impact resistance necessary to pass the various tests has required either heat treatment or ion exchange, prior to the lenses being finished and edged. If lenses are coated at the factory level, coatings have to withstand these treatments, i.e. either the heat treatment or the ion exchange treatment, without nullifying the benefit of the treatment of damaging coated surfaces. If this is not possible, factory coated lenses cannot be built and inventoried. In a series of laboratory experiments in a vacuum coater, a group of coatings were deposited on glass lenses in preparation for ion-exchange experiments. A quarter wave thickness of each of the materials selected from the following table was applied to a glass lens and the lens was then ion-exchanged. The resulting coated lenses were tested by x-ray microprobe technique to determine ion penetration into the lens. The lenses were examined for physical damage to the coating. The lenses were studied to determine if stress patterns had developed during the ion-exchanged hardening process. The lenses used were standard crown ophthalmic lenses of index of 1.523. The lenses were near plano with no cylinder. The lenses had been rejected from normal manufacturing procedures for reasons irrelevant to the tests herein reported.

Table

| Material | Refractive Index Nominal | Measured Before | Measured After | Ion-Exchange Surface Compression Depth(mm) | Ion-Exchange Surface Compression Stress(psi) | Comments |
| --- | --- | --- | --- | --- | --- | --- |
| $MgF_2$ | 1.38 | 1.36 | 1.50 | | | Coating removed |
| $SiO_2$ | 1.46 | 1.465 | 1.47 | 66 | 29600 | Absorption band at 420 nm |
| $ThF_4$ | 1.54 | 1.525 | | | | Unstable |
| Schott 8329 Glass | 1.47 | 1.475 | 1.50 | 46 | 34400 | Slight Index increase |
| $CeF_3$ | 1.60 | 1.61 | 2.25 | 57 | 29700 | Film oxidized |
| $Al_2O_3$ | 1.62 | 1.61 | 1.61 | 0 | 0 | No penetration of ions |
| MgO, $Al_2O_3$, $SiO_2$, Triple Spinel | 1.61 | 1.68 | 1.68 | 31 | | Stabile |
| $Y_2O_3$ | 1.75 | 1.83 | 1.82 | 46 | 52100 | Stabile |
| $La_2O_3$ | 1.80 | 1.82 | 1.81 | 15 | | Thickness increased 4% |
| $Nd_2O_3$ | 1.85 | 1.86 | 1.86 | 29 | 18500 | Stabile |
| $ZrO_2$ | 2.05 | 2.09 | 2.09 | 51 | 25800 | Stabile |
| $Ta_2O_5$ | 2.15 | 1.81 | 1.81 | 62 | 41400 | Stabile |
| $CeO_2$ | 2.34 | 2.21 | 2.21 | 55 | 28300 | Reduced absorption |
| $TiO_2$ | 2.40 | 2.31 | 2.06 | 55 | 45500 | Index decreased |
| Patinal Substance I | 2.05 | 2.09 | 2.09 | 55 | 28200 | Stabile |
| $SiO_x (1<x<2)$ | 1.47–1.90 | 1.82 | 1.50 | | | Strong absorption band at 420 nm. Somewhat scattering |

The glass lenses were coated on the convex side only. Reflectance and transmittance were measured before and after subjecting the lens to the ion exchange process. The ion exchange process was a potassium nitrate bath at 454° C. for 16 hours. With the exception of $MgF_2$ and $SiO_x$, the coatings appeared to be intact and undamaged by the process. Several interesting changes did occur. In general, the oxides were stabile, some showing an increase in thickness while maintaining essentially the same index. Fluorides were apparently oxidized, the most notable case being $CeF_3$ which appeared to be converted entirely to $CeO_2$ with an index of about 2.25. The $MgF_2$ coating appeared to be removed or oxidized to a state such that its index matched that of the glass. The coatings containing Si, i.e. the $SiO_x$ and the $SiO_2$, developed a narrow absorption band at 420 nm with a width of 60 nm. In the table we mention "patinal substance 1". This material is manufactured by the Merck Company and consists of sintered zirconium dioxide.

Our experimental work indicated that only certain of the available coating materials may be utilized to form an antireflective coating on glass ophthalmic lenses which are to be subject to ion exchange treatment. Coating materials which are chemically, or physically, attacked or modified by the ion-exchange treatment cannot be utilized. However, with correct selection it is possible to antireflection coat glass lenses at the factory level prior to edging and ion-exchange treatment. It is clear that all coating materials are not ion-exchangeable. Sulphides and fluorides are incompatible with the ion-exchange process although oxides as a class are compatible. The fluorides were found soft and washed away as a result of ion exchange. The oxides may or may not be ion-exchangeable with only those capable of passing potassium ions eventually found to be usable. Thus, oxides as a class with the ability to pass potassium ions in and sodium ions out from the glass substrate may be used. In addition, as the table indicates, many materials change index of refraction. Thus, the selected oxide material must not change its index of refraction or transparency during ion-exchange treatment. It must maintain its integrity and not craze. As tables I, II, and III above note the antireflective coating according to this invention may be comprised of at least two layers with the outer layer always being silica.

Our studies, as mentioned, indicated that aluminum oxide, a common prior art coating, is not usable since its atomic lattice structure is insufficiently large as to allow the potassium ions to pass. We determined this by taking one of the coated lenses, after ion exchange, slicing it across to expose opposed surfaces and study the resulting cross-section with a polariscope. A colored band is visible below the antireflection coating which indicates a penetration of potassium ions and thus ion exchange.

Prior workers seemed to have assumed that one cannot coat for ion exchange and our experimental work indicates the unsatisfactory results when $MgF_2$ is used may be one of the primary reasons for this conclusion $MgF_2$ being one of the, if not the most, commonly used antireflective coating materials. We discovered, according to our preferred embodiment, that a limited number of coating materials can be used if selected bearing in mind the criteria above set forth.

Edging may be subsequent to the application of the antireflective coating. The antireflective coating in the preferred embodiment is on both surfaces although it can be on one surface only. We have discussed the utilization of an evaporable glass. It should be understood that the preferred coating material is fused silica because of its purity.

Having thus described the invention in detail with sufficient particularly as to enable one skilled in the art to practice the invention, what is desired to be protected by letters patent is set forth in the following claims.

What is claimed is:

1. A glass ophthalmic lens comprising, a glass lens substrate having an ion-exchanged antireflection coating over at least one surface thereof, said antireflection coating being comprised of metal oxide film of oxides selected from the group consisting of $TiO_2$, $CeO_2$, $ZrO_2$, $La_2O_3$, $Nd_2O_3$, $Al_2O_3$ in combination with another oxide of the group, and $SiO_2$, said $SiO_2$ constituting at least the outermost layer of the film, said film, capable of allowing passage of potassium and sodium ions therethrough during ion-exchange treatment of the lens without change in chemical composition or physical integrity of said film, said lenses capable of passing ANZI Z80.1 and USAS Z87.1 tests.

2. The lens of claim 1 in which the coating is applied over both surfaces of the lens substrate.

3. The lens of claim 1 in which the glass substrate is crown glass of an index of about 1.5, and the coating consists of a combination of $CeO_2$ of an index of about 2.3 and as an outermost layer $SiO_2$ of an index of about 1.4.

4. A lens according to claim 1 in which the coating is a bilayer antireflecting coating answering to the formula G 1.0 H 1.0 L, Air in which:

| G | H | L |
|---|---|---|
| (n=1.52) | $SiO_x$, $1<x<2$ ($1.47<n<1.90$) $MgO-Al_2O_3-SiO_2$ Spinel (n=1.68) | $SiO_2$ (n=1.46) Schott #8329 Glass (n=1.47) |

5. A lens according to claim 1 in which the coating is a bilayer antireflection coating answering to the formula G 2.0 H 1.0 L, Air in which:

| G | 2H | L |
|---|---|---|
| (n=1.52) | $Nd_2O_3$ (n=1.86) $ZrO_2$ (n=2.05) $CeO_2$ (n=2.34) $TiO_2$ (n=2.40) | $SiO_2$ (n=1.46) Schott #8329 Glass (n=1.47) |

6. A lens according to claim 1 in which the coating is a trilayer antireflection coating answering to the formula G 1.0 M 2.0 H 1.0 L, Air in which:

| G | M | 2H | L |
|---|---|---|---|
| (n=1.52) | $SiO_x$ Spinel | $ZrO_2$ $CeO_2$ $TiO_2$ | $SiO_2$ Schott Glass |

* * * * *